United States Patent
Huang et al.

(10) Patent No.: US 7,660,482 B2
(45) Date of Patent: Feb. 9, 2010

(54) METHOD AND APPARATUS FOR CONVERTING A PHOTO TO A CARICATURE IMAGE

(75) Inventors: Jincheng Huang, Sunnyvale, CA (US); Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 962 days.

(21) Appl. No.: 10/875,901

(22) Filed: Jun. 23, 2004

(65) Prior Publication Data

US 2005/0286799 A1 Dec. 29, 2005

(51) Int. Cl.
G06K 9/40 (2006.01)
G06K 9/46 (2006.01)
G06K 5/00 (2006.01)

(52) U.S. Cl. .................. 382/275; 382/190; 382/118; 345/646

(58) Field of Classification Search .................. 382/118, 382/190, 275; 345/646
See application file for complete search history.

(56) References Cited

U.S. PATENT DOCUMENTS

| | | | |
|---|---|---|---|
| 4,455,320 A * | 6/1984 | Syrmis | 426/383 |
| 4,864,410 A * | 9/1989 | Andrews et al. | 358/443 |
| 5,719,951 A | 2/1998 | Shackleton et al. | |
| 5,905,807 A | 5/1999 | Kado et al. | |
| 5,933,527 A | 8/1999 | Ishikawa | |
| 6,181,806 B1 * | 1/2001 | Kado et al. | 382/118 |
| 6,292,575 B1 * | 9/2001 | Bortolussi et al. | 382/118 |
| 6,385,628 B1 | 5/2002 | Massarsky | |
| 6,484,901 B1 | 11/2002 | Kim | |
| 6,526,161 B1 | 2/2003 | Yan | |
| 6,600,830 B1 | 7/2003 | Lin et al. | |
| 6,619,860 B1 | 9/2003 | Simon | |
| 7,027,622 B2 | 4/2006 | Pengwu | |
| 7,030,882 B1 | 4/2006 | Kato et al. | |
| 7,106,887 B2 | 9/2006 | Kinjo | |
| 2002/0018595 A1 | 2/2002 | Kwak | |
| 2002/0048399 A1 * | 4/2002 | Lee et al. | 382/165 |
| 2002/0136435 A1 * | 9/2002 | Prokoski | 382/118 |

(Continued)

FOREIGN PATENT DOCUMENTS

EP 0 664 527 A1 7/1995

(Continued)

OTHER PUBLICATIONS

L. Liang et al., "Example-Based Caricature Generation with Exaggeration", *Proceedings of the 10th Pacific Conference on Computer Graphics and Applications*, 2002, pp. 386-393.

(Continued)

*Primary Examiner*—Bhavesh M Mehta
*Assistant Examiner*—Stephen R Koziol

(57) ABSTRACT

A method for creating a caricature image from a digital image is provided. The method initiates with capturing digital image data. The method includes locating a facial region within the captured image data. Then, a facial feature template matching a facial feature of the facial region is selected. Next, the facial feature template is substituted for the facial feature. Then, the facial feature template is transformed into a caricature or non-realistic image. A computer readable medium, an image capture device capable of creating a caricature from a captured image and an integrated circuit are also provided.

6 Claims, 8 Drawing Sheets

U.S. PATENT DOCUMENTS

| | | | |
|---|---|---|---|
| 2003/0053663 | A1 | 3/2003 | Chen et al. |
| 2003/0095701 | A1 | 5/2003 | Shum et al. |
| 2003/0163315 | A1 | 8/2003 | Challapali et al. |
| 2003/0190060 | A1 | 10/2003 | Pengwu |
| 2003/0206171 | A1 | 11/2003 | Kim et al. |
| 2005/0008246 | A1 | 1/2005 | Kinjo |
| 2005/0207654 | A1 * | 9/2005 | Rodyushkin et al. ........ 382/217 |
| 2005/0212821 | A1 * | 9/2005 | Xu et al. ..................... 345/647 |
| 2006/0251299 | A1 | 11/2006 | Kinjo |
| 2007/0019885 | A1 * | 1/2007 | Chatting et al. ............. 382/289 |

FOREIGN PATENT DOCUMENTS

| | | |
|---|---|---|
| EP | 0 990 979 | 4/2000 |
| EP | 1 205 892 | 5/2002 |
| FR | EP0990979 A1 * | 4/2000 |
| JP | 07-244726 | 9/1995 |
| JP | 11-144088 | 5/1999 |
| JP | 2000-067255 | 3/2000 |
| JP | 2000-155836 | 6/2000 |
| JP | 2000-339481 | 12/2000 |
| JP | 2002-63585 | 2/2002 |
| JP | 2002-077592 | 3/2002 |
| JP | 2003-331316 | 11/2003 |
| TW | 569148 B | 1/2004 |

OTHER PUBLICATIONS

T. Fujiwara et al., "A Method for 3D Face Modeling and Caricatured Figure Generation", *Proceedings 2002 IEEE International Conference on Multimedia and Expo*, vol. 2, 2002, pp. 137-140.

A. Pujol et al., "Automatic View Based Caricaturing", *Proceedings 15th International Conference on Pattern Recognition*, Sep. 2000, pp. 1072-1075.

H. Koshimizu et al., "On KANSEI Facial Image Processing for Computerized Facial Caricaturing System PICASSO", *IEEE International Conference on Systems, Man and Cybernetics*, vol. 6, Oct. 1999, pp. 294-299.

A. Pujol et al., "Learning and Caricaturing The Face Space Using Self-Organization and Hebbian Learning For Face Processing", *Proceedings 11th International Conference on Image Analysis and Processing*, Sep. 2001, pp. 273-278.

* cited by examiner

METHOD AND APPARATUS FOR CONVERTING A PHOTO TO A CARICATURE IMAGE

BACKGROUND OF THE INVENTION

1. Field of the Invention

This invention relates generally to rendering systems and more particularly to a method and apparatus for generating a caricature of a digital image.

2. Description of the Related Art

Currently, if a consumer would like to generate a caricature image from a picture taken from a digital camera or a cell phone camera, the user must transfer the image to a desktop computer for processing. The computing resources required to develop the caricature image are not available with the current hand held electronic devices. As a result, a user has no alternatives to immediately create a caricature image from a digital image captured by a handheld device. With the proliferation with cell phone cameras and other hand held devices with camera capability, along with the ease with which captured images may be shared, users are constantly seeking devices with enhanced functionality. Thus, if a user had the capability of creating an image from the handheld device, the user will then be able to email the caricature image to a recipient, e.g., with a cell phone camera application or just view the image with the subject of the photo.

As a result, there is a need to solve the problems of the prior art to enable automatic generation of a caricature image from a digital image in a manner that is compatible with the limited computing resources of a handheld electronic image capture device.

SUMMARY OF THE INVENTION

Broadly speaking, the present invention fills these needs by providing a method and system capable of generating a caricature or a non-realistic transformation of image data in an efficient manner. It should be appreciated that the present invention can be implemented in numerous ways, including as a method, a system, computer readable media or a device. Several inventive embodiments of the present invention are described below.

In one embodiment, a method for creating a caricature image from a digital image is provided. The method initiates with capturing digital image data. The method includes locating a facial region within the captured image data. Then, a facial feature template matching a facial feature of the facial region is selected. Next, the facial feature template is substituted for the facial feature. Then, the facial feature template is transformed into a caricature or non-photo-realistic image.

In another embodiment, a method for locating a facial region within an image for subsequent transformation is provided. The method initiates with generating a skin tone map of the image. The method includes identifying a skin tone region within the skin tone map. Then, both a horizontal centroid line and a vertical centroid line within the skin tone region are identified. Next, a horizontal center point of the horizontal centroid line and a vertical center point of the vertical centroid line are converged. Then, the facial region is defined around the converged center point.

In yet another embodiment, a computer readable media having program instructions for creating a caricature image from a digital image is provided. The computer readable medium includes program instructions for capturing digital image data and program instructions for locating a facial region within the captured image data. Program instructions for selecting a facial feature template matching a facial feature of the facial region are included. Program instructions for substituting the facial feature template for the facial feature and program instructions for transforming the facial feature template are provided.

In still yet another embodiment, a computer readable medium having program instructions for locating a facial region within an image for subsequent transformation is provided. The computer readable medium includes program instructions for generating a skin tone map of the image and program instructions for identifying a skin tone region within the skin tone map. Program instructions for identifying both a horizontal centroid line and a vertical centroid line within the skin tone region are included. Program instructions for converging a horizontal center point of the horizontal centroid line and a vertical center point of the vertical centroid line and program instructions for defining the facial region around a converged center point are provided.

In another embodiment, an image capture device capable of creating a caricature from a captured image is provided. The image capture device includes image capture circuitry for capturing digital image data and caricature generating logic configured to transform a facial region of the image data. The caricature generating logic includes facial feature location logic configured to identify a facial region. The facial feature location logic is further configured to identify a search region within the facial region. The facial feature is identified within the search region through a gradient image generated by the facial feature location logic. The caricature generating logic includes template matching logic configured to match the facial feature with a template. The template is then substituted into the image data for the facial feature. Image morphing logic is included in the caricature generating logic. The image morphing logic is configured to transform the image data with the substituted template to form the caricature.

In yet another embodiment, an integrated circuit configured to locate facial features within image data is provided. The integrated circuit includes facial feature location circuitry configured to identify a facial region. The facial feature location circuitry is configured to identify a search region within the facial region. The facial feature location circuitry includes gradient image generation circuitry configured to generate a gradient image of the search region, wherein a vertical component of the gradient image is used to locate a facial feature within the search region. Template matching logic configured to match the facial feature with a template in order to substitute the template for the facial feature is included. Image morphing logic configured to transform the image data with the substituted template to form the caricature is provided in the integrated circuit.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a system, and method for generating a caricature from image data. It will be obvious, however, to one skilled in the art, that the present invention may be practiced without some or all of these specific details. In other instances, well known process operations have not been described in detail in order not to unnecessarily obscure the present invention.

The embodiments described herein provide a method and a system that converts a digital image, i.e., a photograph, to a caricature. Through the use of a skin tone algorithm and facial feature location logic, the key features of a face are located in order to be manipulated into a caricature. The located features in the digital image are then matched with templates stored in a library to identify the closest resembling template. The template with the best match is then substituted for the feature in the digital image. In one embodiment, the substituted template is a distorted feature. Alternatively, the template may be distorted through image morphing techniques described below. In another embodiment, the key features of the facial region are defined when the image is taken. For example, a user may place the facial features of the subject of the image into a template defined through the viewfinder prior to capturing the image data.

Figure 1:
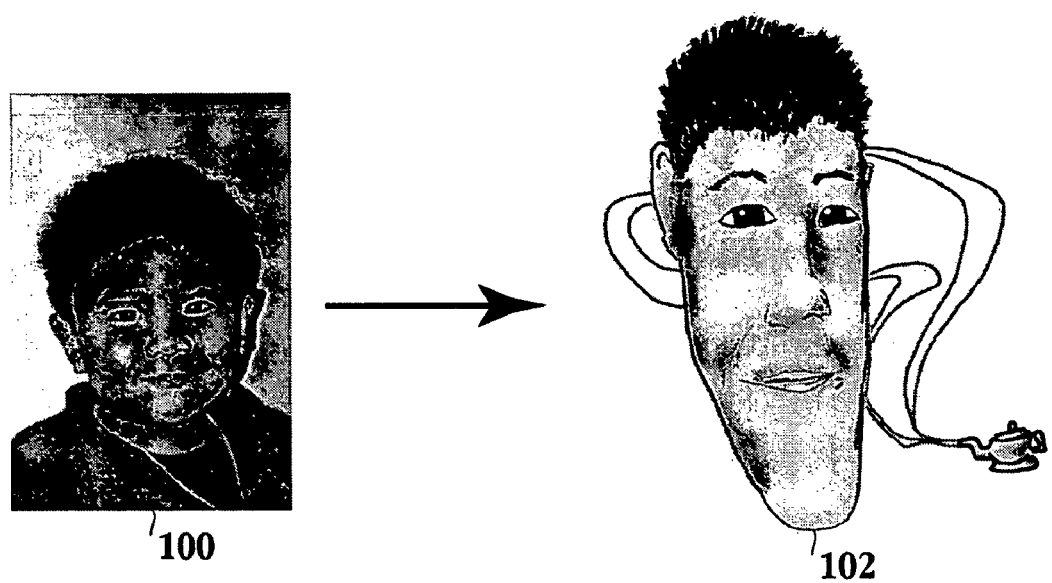
FIG. 1 is a high level schematic diagram illustrating the results of the embodiments described below for converting an image into a caricature.

FIG. 1 is a high level schematic diagram illustrating the results of the embodiments described below for converting an image into a caricature. Here, image 100 is a representation of a digital image captured through an image capture device such as a digital camera, cell phone camera, or other suitable hand held electronic device having camera capability. Through the techniques described below, image 100 is transformed to caricature image 102. This transformation is performed through the logic and circuitry of the image capture device, thereby enabling the user to instantaneously transform a captured image. Of course, numerous background features may be incorporated into the caricature image, or any other suitable feature, along with the facial image distortion. For example, image 102 has a genie lamp incorporated therein.

Figure 2:
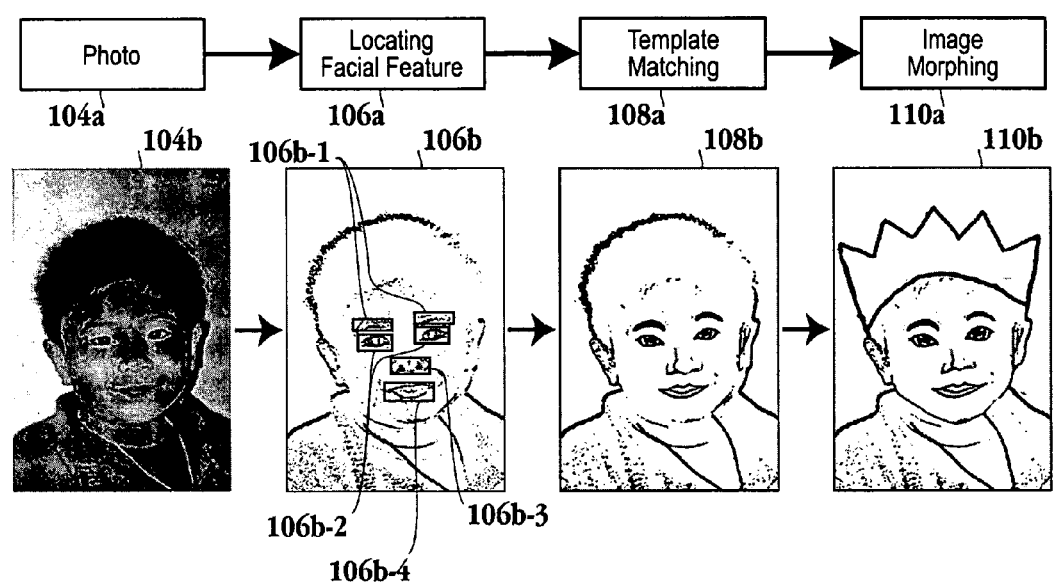
FIG. 2 is a high level schematic diagram illustrating the key modules in achieving the conversion of a digital image to a caricature image in accordance with one embodiment of the invention.

FIG. 2 is a high level schematic diagram illustrating the key modules in achieving the conversion of a digital image to a caricature image in accordance with one embodiment of the invention. In module 104a a digital image is captured, i.e., a photograph is taken through the hand held device. The hand held device used to capture the image may be a digital camera, cell phone camera, personal digital assistant with camera functionality, etc. For example, image 104b is one such image capable of being captured by an image capture device. Module 106a represents the functionality for locating the facial features of the captured image. Here, the image data of image 104b is analyzed in order to first define a facial region and then locate facial features within the facial region. In one embodiment, a skin tone algorithm is used to locate the facial region. Once the facial region is determined, the facial features within the facial region are then identified. For example, regions 106b-1, 106b-2, 106b-3, and 106b-4 represent locations where facial features are identified. That is, the eyebrows are located within region 106b-1, the eyes are located in region 106b-2, the nose is located in region 106b-3 and the mouth is located in region 106b-4. Through template matching module 108a, the located facial features are matched with templates. The templates are stored in a suitable library which may be located within the image capture device or external to the image capture device. That is, the templates may be stored in non-volatile memory of the device.

In one embodiment, a match is determined by comparing pixels between the template and the adjusted captured image where the comparison yielding the minimum error is identified as the best match. It should be appreciated that the located facial features may have its size adjusted in order to provide a like-comparison between similar size regions associated with the located facial feature and the corresponding template in the template library. Image 108b illustrates the result of the substitution of a matched template into the digital image of 106b. Here, the eyebrows, eyes, nose and mouth facial features have been substituted into the image. Image morphing module 110a provides the mechanism by which the template substituted image 108b is transformed into a caricature image or non-photo-realistic image. Image 110b illustrates the results of image morphing where the substituted templates may be transformed to display a caricature. Other original image data may be transformed besides the located facial feature in order to achieve a caricature image. Essentially any image data may be transformed through stretching, rotation, shrinking, translation, or other suitable geometric transformation techniques. Additionally, objects may be incorporated into the image data. For example, in image 110b the subject of the image has a crown placed on its head. One skilled in the art will appreciate that numerous other items, objects or substitutions may be made with the image data in order to achieve the result desired by the user.

Figure 3:
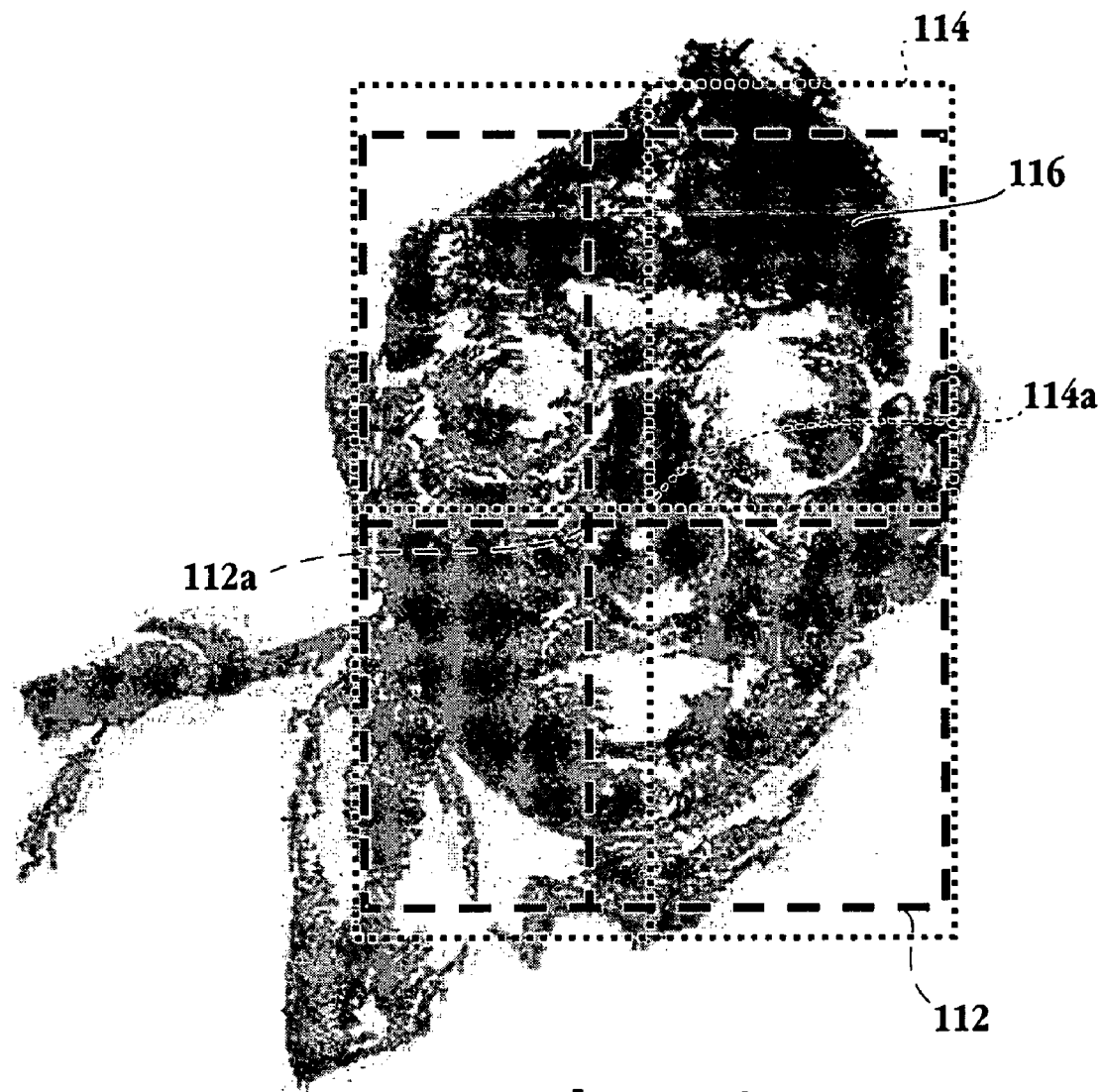
FIG. 3 is a simplified schematic diagram illustrating the technique of locating the facial region of the subject of an image in accordance with one embodiment of the invention.

FIG. 3 is a simplified schematic diagram illustrating the technique of locating the facial region of the subject of an image in accordance with one embodiment of the invention. It should be appreciated that simply placing a rectangular box on the skin tone region would provide for unacceptable errors in the size of the facial features. The shaded portion of FIG. 3 represents a skin tone map in which the shaded portion represents skin tone pixels while the remainder or white portion represents non-skin tone pixels. Initially, a potential facial region represented as region 112 is located. The centroid of the skin tone region is defined as the initial center point 112a having coordinates $(C_x, C_y)$ of the facial region. This potential facial region is then refined to define true facial region 114 through analysis of the skin tone region. The following equation represents the calculation of the center points:

$$C_x = \frac{\sum x}{N}, \quad C_y = \frac{\sum y}{N},$$

for all M(x,y)=Skintone,

Where M(x,y) denote skin tone map of an image and N is the total number of skin tone pixels in the region.

The bounded box of the facial region is defined by extending from the center point to the boundary of the skin tone region in vertical and horizontal directions. Let $x_l$ and $x_r$ represent the two outermost skin tone points along the horizontal centroid line, i.e., $M(x_l,C_y)$=Skintone, and $M(x,C_y)\neq$Skintone for $x<x_l$;

$M(x_r,C_y)$=Skintone, and $M(x,C_y)\neq$Skintone for $x<x_r$.

Similarly, $y_t$ and $y_b$ represent the two outermost skin tone points along the vertical centroid line, which satisfy:

$M(C_x,y_t)$=Skintone, and $M(C_x,y)\neq$Skintone for $y<y_t$;

$M(C_x,y_b)$=Skintone, and $M(C_x,y)\neq$Skintone for $y<y_b$.

If $$\left|\frac{x_l+x_r}{2} - C_x\right| > T \text{ or } \left|\frac{y_t+y_b}{2} - C_y\right| > T,$$

the new center point $(C_x, C_y)$ of facial region is defined as $$(C_x, C_y) = \left(\frac{x_l+x_r}{2}, \frac{y_t+y_b}{2}\right).$$

The processes of determining $(x_l,x_r,y_t,y_b)$ and $(C_x,C_y)$ repeat until these two sets of data converge, i.e., $$\left|\frac{x_l+x_r}{2} - C_x\right| \leq T \text{ and } \left|\frac{y_t+y_b}{2} - C_y\right| \leq T,$$

where T represents a threshold value.

In FIG. 3, the outline of region 112 was the initial region and then through one reiteration described above in the equations, the facial region was adjusted to the rectangular region defined by outline 114. Thus, initially the center point was at point 112a and eventually moved to point 114a through the convergence of the two sets of data according to the equations listed above. Of course, any number of reiterations may be used to define the facial region.

Figure 4:
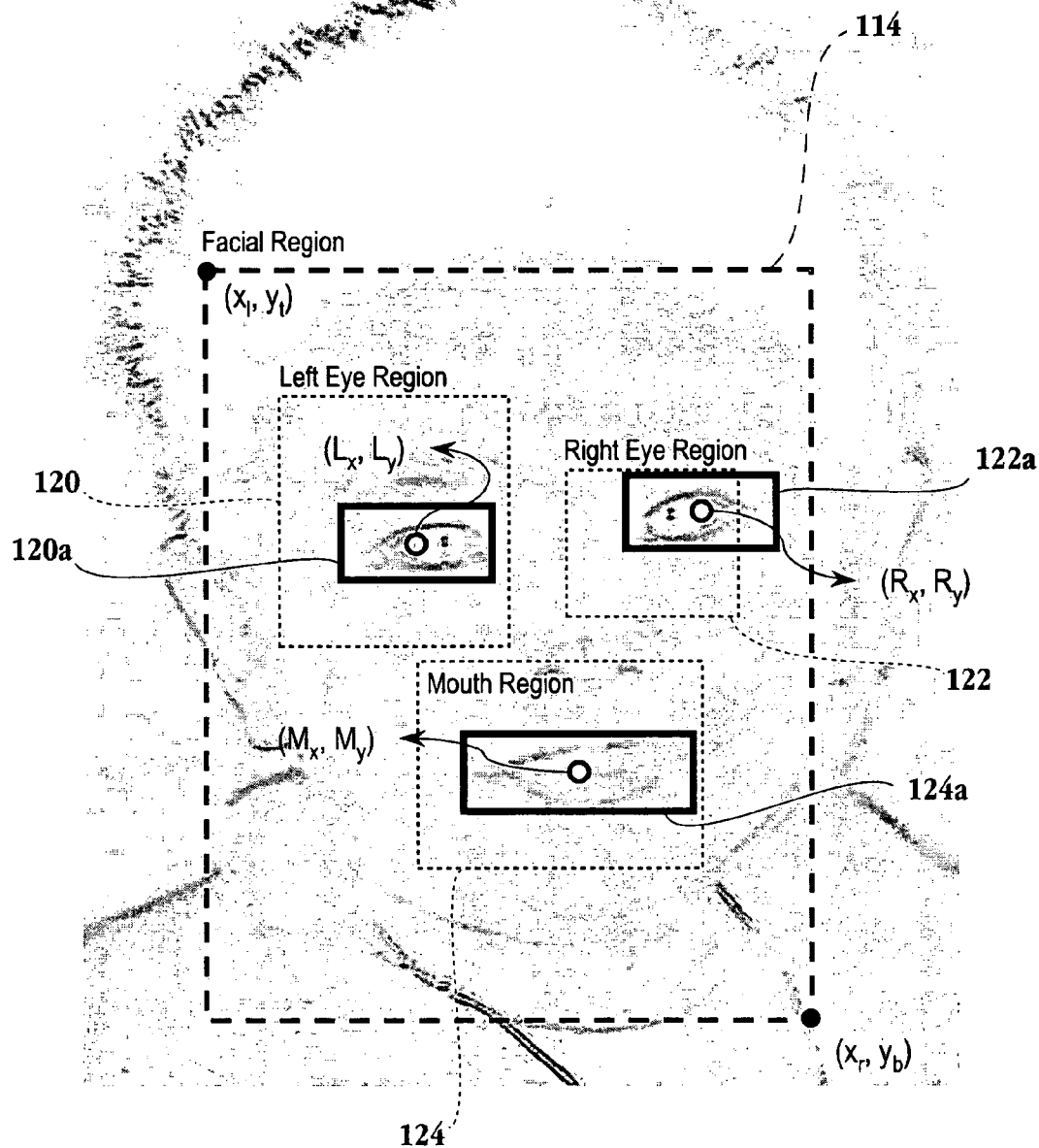
FIG. 4 is a simplified schematic diagram illustrating the search windows and corresponding facial feature location regions within the facial region in accordance with one embodiment of the invention.

FIG. 4 is a simplified schematic diagram illustrating the search windows and corresponding facial feature location regions within the facial region in accordance with one embodiment of the invention. Here, facial region 114 which has starting coordinates of $(x_l,y_t)$ and ending point $(x_r,y_b)$. Within facial region 114, search regions for the left eye, right eye and mouth region are contained. For example, left eye region 120 is the search region in order to pinpoint window 120a for the left eye. Similarly, right eye region 122 and mouth region 124 provide the search regions for pinpointing right eye window 122a and mouth window 124a, respectively. Thus, the facial region is fit into a rectangular box as described with reference to FIG. 3 and the facial features within the facial region are then fit into a template. It should be appreciated that the facial features may be located based on a gradient image.

Two key features of an face are the eyes and mouth. The vertical component of the gradient image over the regions of eyes and mouth are usually large and can be used to locate the eyes and the mouth. The vertical gradient is defined as:

$$G_y(x,y)=|((F(x,y-1)-F(x,y+1))*2+F(x-1,y-1)-F(x-1,y+1)+F(x+1,y-1)-F(x+1,y+1)|$$

where F(x,y) is the intensity image. One skilled in the art will appreciate that other definitions of vertical gradient are possible.

In one embodiment, the locations of eyes and mouth are determined by finding the maximum sum of vertical gradient in a window in a search region. The accuracy of the locations depend on the size of the window and the search region. The searches for other facial features such as nose and eyebrows depend on the geometric constraints of a face, such as eyebrows are above eyes and nose is in between mouth and eyes. Thus, once the eyes and the mouth have been located through the maximum sum of vertical gradients, the remaining facial features may be located through knowledge of the geometric constraints.

It should be appreciated that the locations and the dimensions of eyes and mouth depend on the location and size of the facial region, which is bounded by the starting point $(x_l,y_t)$ and the ending point $(x_r,y_b)$. The facial region has a dimension of $F_x=x_r-x_l$ and $F_y=y_b-y_t$.

The dimension of the window for an eye region is given by:

$$X_{eye} = \frac{F_x}{P},$$

$$Y_{eye} = \frac{X_{eye}}{2}.$$

It is reasonable to use P in the range of 3.5 to 5.0. In one exemplary embodiment, P=4.0. The center of the left eye window is $(L_x,L_y)$ and the right eye window is $(R_x,R_y)$. The search area of the left eye is from $$\left(x_l + X_{eye}, y_t + \frac{F_y}{6}\right)$$

to $$\left(x_l + \frac{F_x}{2}, y_t + \frac{F_y}{2}\right).$$

The range for the right eye is relative to the left eye and it is from $(L_x+2*X_{eye}, L_y-2*Y_{eye})$ to $(x_r-2*X_{eye}, L_y+2*Y_{eye})$.

The dimension of mouth window is determined by $$X_{mouth} = F_x * 0.4,$$

$$Y_{mouth} = \frac{X_{mouth}}{3}.$$

The center of the window is ($M_x$, $M_y$). The searching area is $$\left(L_x, \frac{L_y + R_y}{2} + S_y\right)$$

to $$\left(R_x, \frac{L_y + R_y}{2} + S_y * 2\right),$$

where $$S_y = \frac{(R_x - L_y) * 3}{4}.$$

As mentioned above, other facial features are relative to locations of eyes and mouth. Thus, in one embodiment, once eyes and mouth are found, the eyebrows can be searched in the areas above eyes, and the nose is searched in between eyes and mouth.

In another embodiment, a template assisted approach may be utilized with the embodiments described herein as an alternative to locating the facial feature through the skin tone algorithm. Here, a template may be incorporated into the viewfinder so that a user may fit the subject's facial features into the corresponding template regions. For example, windows 120a, 122a, and 124a, of FIG. 4, may be outlined in the view finder or the scene being looked at through the image capture device by the user. Thus, the user can then focus, zoom, or perform the necessary adjustments so that the facial features of the subject fall into corresponding regions 120a, 122a, and 124a. More specifically, the eyes of the subject are placed into window 120a and 122a, while the users mouth is contained within window 124a. Once the facial features are within these windows the user can initiate the capture of the image data, e.g., taking a picture of the scene. Through the template matching scheme and the image morphing scheme described herein, a caricature may be generated of the captured image.

Figure 5:
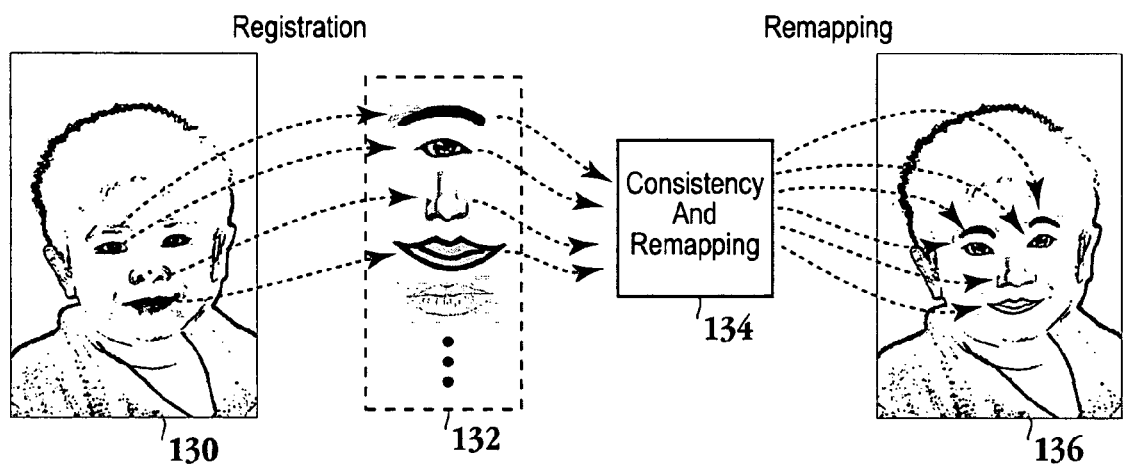
FIG. 5 is a simplified schematic diagram illustrating the template matching scheme in accordance with one embodiment of the invention.

FIG. 5 is a simplified schematic diagram illustrating the template matching scheme in accordance with one embodiment of the invention. Once the facial features are identified as discussed above with reference to FIG. 4, each facial feature goes through a registration process where the minimum error between the corresponding facial feature and a template is determined. Here, the comparison of the facial feature to numerous corresponding templates will result in a number of errors associated with each comparison. The minimum error of all these comparisons indicates a best match. Here, the facial features identified in the original image 130 are compared to corresponding features in template library 132. That is, the eyebrows are compared with corresponding eyebrows in the template library 132, the eyes of the original image 130 are compared to corresponding eyes within template library 132 and so on. The template library may be configured to store any suitable amount of templates. In addition, the template library may store pre-transformed templates which may be substituted for a matched template. In one embodiment, since the facial features have different sizes and different orientations for different photos, the size of the facial feature may be adjusted to the size of the template in order to compare similar sized regions. In another embodiment, a geometric transformation is defined as:

$$U = AX + B,$$

or $$\begin{bmatrix} u \\ v \end{bmatrix} = \begin{bmatrix} a_1 & a_2 \\ a_4 & a_5 \end{bmatrix} \begin{bmatrix} x \\ y \end{bmatrix} + \begin{bmatrix} a_3 \\ a_6 \end{bmatrix}.$$

Let F(x,y) be the feature and T(u,v) be the template, the mean square error between the feature and the template with a given set of transformation coefficients is then defined as:

$$E(a) = \frac{1}{2} \sum_{i=1}^{M} (F(X_i) - T(AX_i + B_i))^2,$$

where $a = [a_1 \ a_2 \ \ldots \ a_6]^T$ and M is the number pixels in the feature. From the optimization theory, the optimal solution of a must satisfy:

$$\frac{\partial E(a)}{\partial a_i} = \sum_{i=1}^{M} (F(X_i) - T(AX_i + B_i)) \frac{\partial T(\beta)}{\partial \beta} \frac{\partial \beta}{\partial a_i} \bigg|_{\beta = AX_i + B_i} = 0,$$

$$i = 1, \cdots, 6.$$

The equations above are non-linear functions of $a_i$, and hence a closed-form solution is difficult to achieve. Many iterative algorithms such as the steepest descent method, the Newton-Raphson method, or the Davidon-Fletcher-Powell method can lead to one solution. In the steepest descent method, we have $$a^{j+1} = a^j - \alpha^j \nabla E(a^j),$$

where $\nabla E(a^j) = \begin{bmatrix} \frac{\partial E(a)}{\partial a_1} & \frac{\partial E(a)}{\partial a_2} & \cdots & \frac{\partial E(a)}{\partial a_6} \end{bmatrix}^T.$ It should be appreciated that the initial $\alpha^0$ is chosen. The same α will be used in the next iteration if the error E(a) is decreasing. Otherwise, the previous a is restored and α is reduced.

Once a best match is found between the corresponding facial features and templates, consistency and remapping module 134 ensures that the facial features are placed in the correct region when substituting the templates into the original image 130. For example, consistency and remapping module 134 ensures that the eyes go to the correct location. In addition, geometrical constraints may be imposed here to ensure that the nose is below two eyes and that the mouth is below the nose. Through remapping, the corresponding template is "stitched" into image 136, thereby substituting the templates for the facial features. Of course, a pre-transformed template may be substituted as mentioned above.

Figure 6:
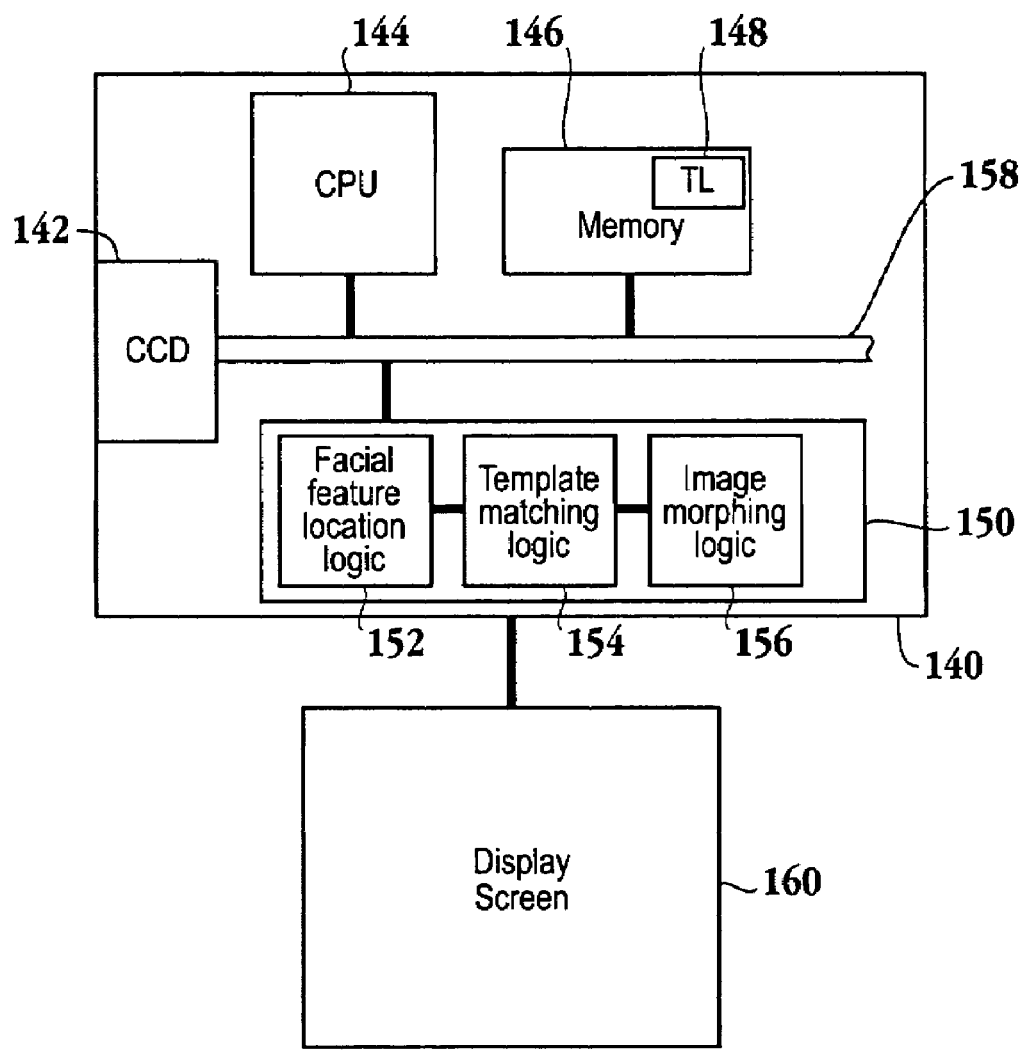
FIG. 6 is a simplified schematic diagram of a device configured to provide a user the capability of creating a caricature image from a captured image in accordance with one embodiment of the invention.

FIG. 6 is a simplified schematic diagram of a device configured to provide a user the capability of creating a caricature image from a captured image in accordance with one embodiment of the invention. Here, device 140 includes charged couple device (CCD) 142, central processing unit (CPU) 144, memory 146, bus 158 and caricature conversion logic 150. CCD 142 is placed behind a lens of device 140, which may be an image capture device, e.g., a device having camera capability. Each of the modules within device 140 is capable of communicating with each other through bus 158. Memory 146 includes template library 148. In one embodiment, template library 148 may be accessed by device 140, e.g., the template library may be external to device 140. That is, template library 148 may be stored on an external server and accessed either wirelessly or through a wired connection by device 140. It should be appreciated that in order to minimize the memory requirements for storing the plurality of templates in the template library, the templates may be stored as a set of end points rather than storing the entire image in memory. Display screen 160 is in communication with device 140 and it should be appreciated that display screen 160 may be incorporated into device 140 as one integral unit. It should be appreciated that display screen 160 may be driven through a separate graphics processing unit (not shown), e.g., a Liquid crystal display controller.

Caricature conversion logic 150 of FIG. 6, includes facial feature location logic 152, template matching logic 154 and image morphing logic 156. Facial feature location logic 152 includes the logic for determining the facial region and for further determining the facial features within the facial region as described with reference to FIGS. 2-4. Template matching logic 154 includes the logic for enabling the matching of the facial features located through facial feature location logic 152 with templates of template library 148. Here, template matching logic 154 includes logic to accomplish the functionality described with respect to FIG. 5. Image morphing logic 156 includes the logic enabling the transformation of the image data in order to define a caricature or non-photo realistic image. Here, geometric transformations may be applied. For example, stretching transformations, rotation transformations, shrinking transformations and translation transformations are applied to achieve the transformation of the image. In essence, any transformation which distorts the feature or image may be applied here.

Figure 7:
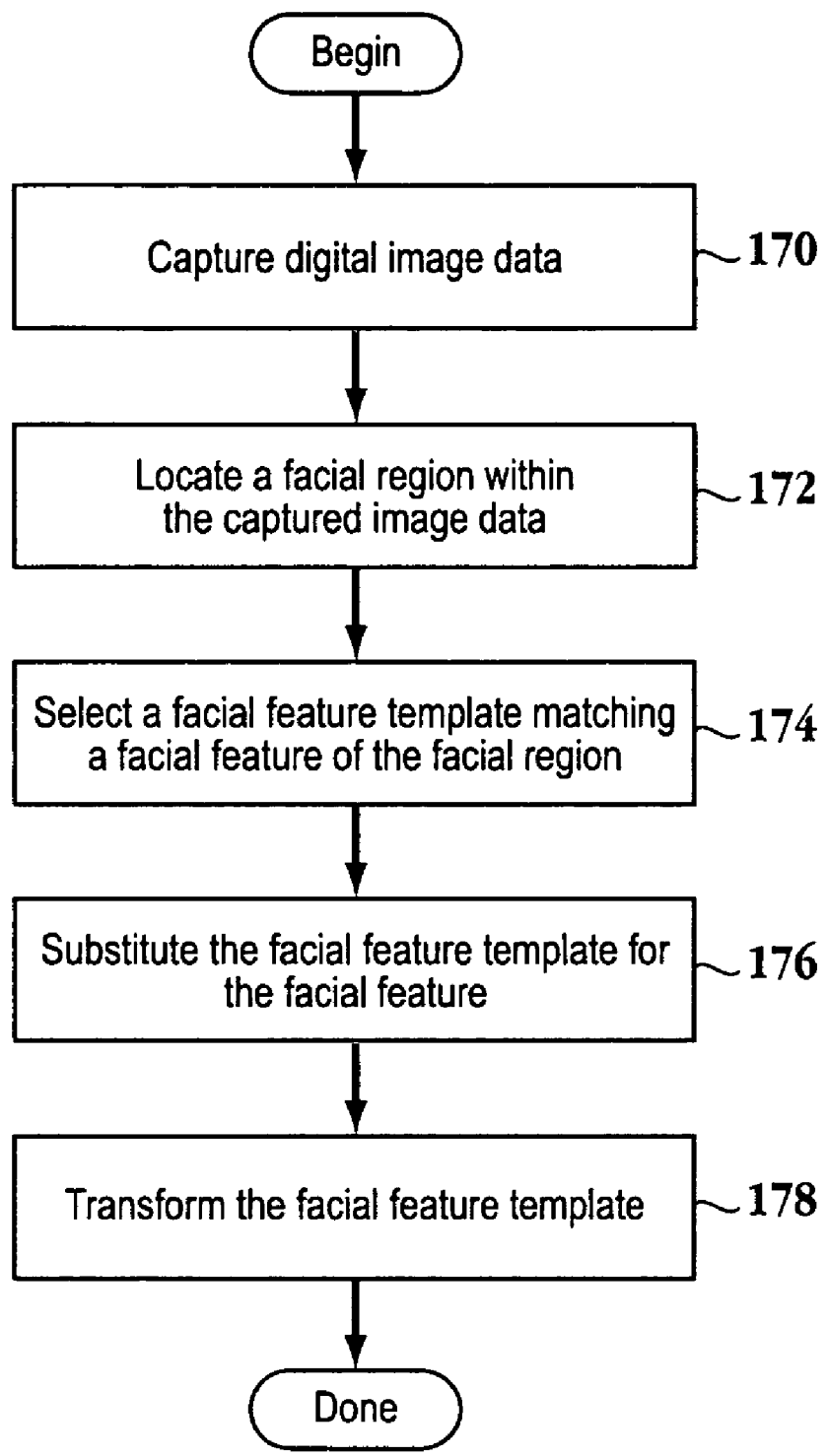
FIG. 7 is a flow chart diagram illustrating the method operations for creating a caricature image from a digital image in accordance with one embodiment of the invention.

FIG. 7 is a flow chart diagram illustrating the method operations for creating a caricature image from a digital image in accordance with one embodiment of the invention. The method initiates with operation 170 where digital image data is captured. The digital image data may be captured through any suitable image capture device such as a digital camera or a cell phone camera. The method then advances to operation 172 where a facial region within the captured image data is located. Here, the facial feature location logic defines a facial region and thereafter locates the search areas to identify a facial feature within the facial region as described above. In one embodiment, a skin tone algorithm is applied to the image data in order to locate the facial region as described above with reference to FIG. 3. In another embodiment, gradient data is analyzed in order to determine the location of the facial features within the facial region.

The method then proceeds to operation 174 where a facial feature template matching a facial feature of the facial region is selected. Here, a comparison between the facial features identified in operation 172 and stored templates is performed in order to determine a best match between the facial feature and the plurality of templates. In one embodiment, corresponding pixel values between the facial feature and the template are compared to identify a match. The method then moves to operation 176 where the facial feature template is substituted for the facial feature inside the image data. As described with reference to FIG. 5 the registration and consistency and remapping functionality may be performed here. The method then advances to operation 178 where the facial feature template is transformed. In one embodiment, the facial feature template is transformed through image morphing. In addition, data other than the facial feature template, e.g., background data or other objects, may be transformed or incorporated in order to present a caricature image of the original captured digital image data.

Figure 8:
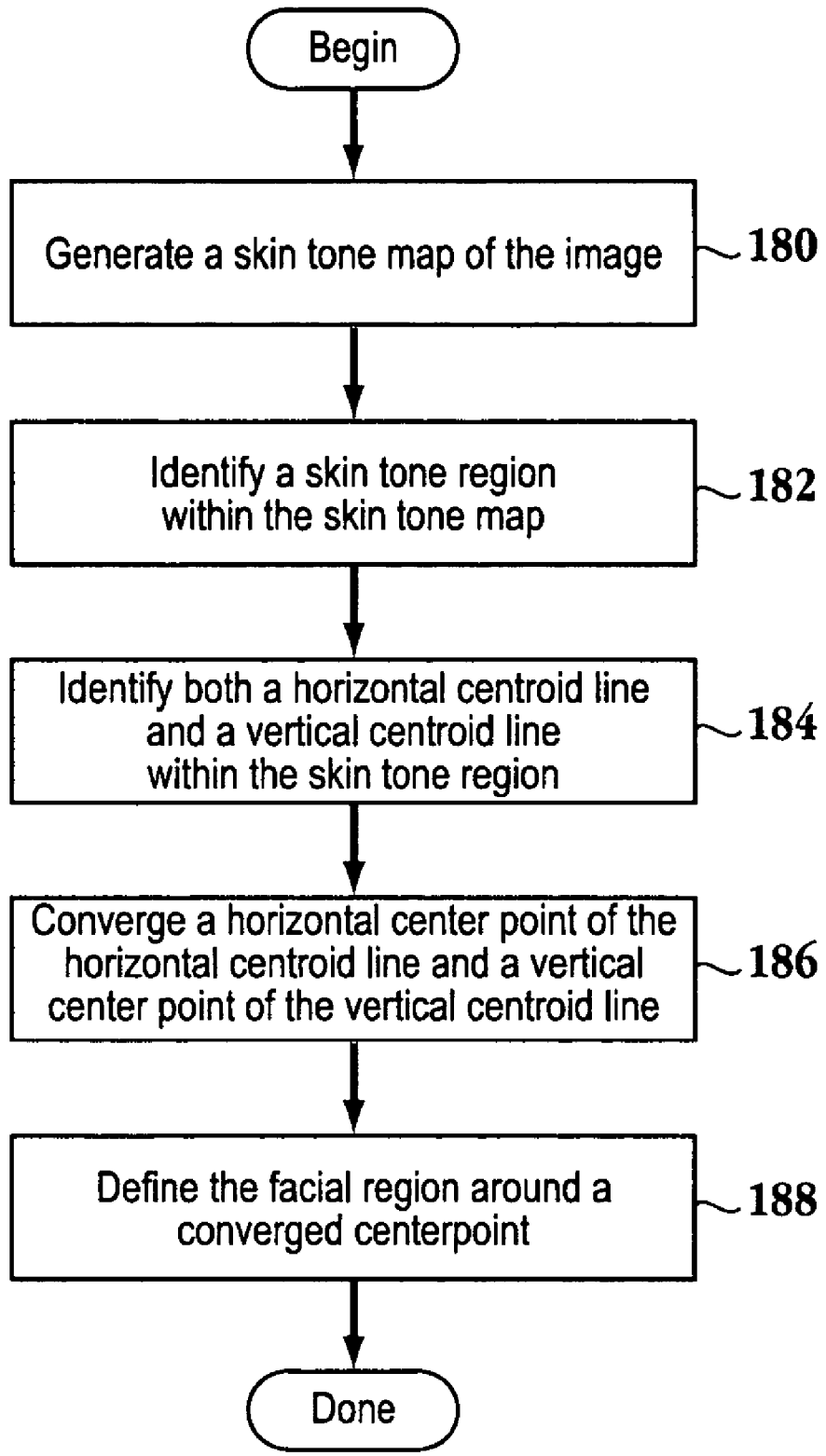
FIG. 8 is a flow chart diagram illustrating the method operations for locating a facial region within an image for subsequent transformation in accordance with one embodiment of the invention.

FIG. 8 is a flow chart diagram illustrating the method operations for locating a facial region within an image for subsequent transformation in accordance with one embodiment of the invention. The method initiates with operation 180 where a skin tone map of the image is generated. Here, a skin tone algorithm applied to each of the pixels of the image data will generate the skin tone map labeling the pixels as either skin tone pixels or non-skin tone pixels. The method then advances to operation 182 where the skin tone region within the skin tone map is identified. Here, isolated or outlier skin tone regions may be discarded. The method then moves to operation 184 where a horizontal centroid line and a vertical centroid line within the skin tone region are identified. The intersection of the horizontal centroid line and the vertical centroid line define an initial center of the facial region.

The method of FIG. 8 then proceeds to operation 186 where a horizontal center point of the horizontal centroid line and a vertical center point of the vertical centroid line converge through a reiterative process. In one embodiment, the reiterative process compares a center of the horizontal centroid line and a previous centroid coordinate. If the comparison between these two components is greater than a threshold value a new center point is defined and the process continues until the comparison between the successive center points is less than a threshold value. The same processing occurs with respect to the vertical centroid line. For example, the equations described above with reference to FIG. 3 may be applied here to converge the center points. The method then proceeds to operation 188 where the facial region is defined around the converged center point. It should be appreciated that the converged center point is determined reiteratively as described above with reference to operation 186. In one embodiment, it is assumed that the face is symmetrical when calculating the true facial region.

In summary, the above-described invention provides a method and device for creating a caricature image from a captured image. In one embodiment, the scheme includes facial feature location techniques followed by template matching and image morphing. The facial feature location techniques may be accomplished through image analysis, e.g., skin tone algorithms to define a facial region. Within the facial region, the location of the eyes and the mouth of the subject of the captured image are determined by finding the maximum sum of the vertical gradient in the window of a search region as discussed with reference to FIG. 4. Alternatively, in a template assisted approach, the face is placed into a rectangular box that defines the facial region or the facial features are placed into pre-set templates as described above. Through the template matching and image morphing techniques a caricature image is immediately generated so that a user may view the image immediately of the hand held device capturing the image. It should be appreciated that while the facial features being captured have been discussed in terms of human facial features, the embodiments described herein may also be applied to animal facial features. Basically, any image in which a face, whether the face be human or non-human, may be manipulated as described above.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above-described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A computer-readable tangible medium encoded with a program executable by a computer to perform a method to identify facial features within image data to form a caricature, the program comprising instructions for:
   identifying a facial region of the image data;
   establishing a window in which a facial feature within the facial region is located;
   generating a gradient image of the window, wherein a vertical component of the gradient image is used to locate the facial feature within the window;
   comparing the facial feature with each of a plurality of stored templates to determine which of the plurality of stored templates most closely corresponds to the facial feature;
   substituting the corresponding template for the facial feature in the image data; and
   transforming the image data containing the substituted template to form the caricature.

2. A device configured to identify facial features within image data to form a caricature, the device comprising:
   facial feature location circuitry configured to (i) identify a facial region of image data, and (ii) establish a window in which a facial feature within the facial region is located;
   gradient image generation circuitry configured to generate a gradient image of the window, where a vertical component of the gradient image is used to locate the facial feature within the window;
   template matching logic configured to compare the facial feature with each of a plurality of stored templates to determine which of the plurality of stored templates most closely corresponds to the facial feature; and
   image morphing logic configured to substitute the corresponding template for the facial feature in the image data and morph the image data containing the substituted template to form the caricature.

3. The device of claim 2, wherein the device comprises an integrated circuit.

4. A computer-readable tangible medium encoded with a program executable by a computer to perform a method of creating a caricature from a captured image, the program comprising instructions for:
   capturing digital image data;
   transforming a facial region of the image data;
   identifying a search region within the facial region, wherein a facial feature is identified within the search region through a gradient image;
   identifying a maximum sum of vertical gradients in the search region, the maximum sum being indicative of a location of the facial feature;
   comparing the facial feature with each of a plurality of stored templates to determine which of the plurality of stored templates most closely corresponds to the facial feature;
   substituting the corresponding template for the facial feature in the image data; and
   transforming the image data containing the substituted template to form the caricature.

5. A device configured to create a caricature from a captured image, the device comprising:
   image capture circuitry configured to capture digital image data;
   caricature generating logic configured to transform a facial region of the image data, the caricature generating logic including,
      facial feature location logic configured to identify a search region within the facial region, wherein a facial feature is identified within the search region through a gradient image generated by the facial feature location logic, the facial feature location logic further including gradient image generation logic configured to identify a maximum sum of vertical gradients in the search region, the maximum sum being indicative of a location of the facial feature;
      template matching logic configured to compare the facial feature with each of a plurality of stored templates to determine which of the plurality of stored templates most closely corresponds to the facial feature;
      image morphing logic configured to substitute the corresponding template for the facial feature in the image data and morph the image data containing the substituted template to form the caricature.

6. The device of claim 5, wherein the device comprises an integrated circuit.

* * * * *